UNITED STATES PATENT OFFICE.

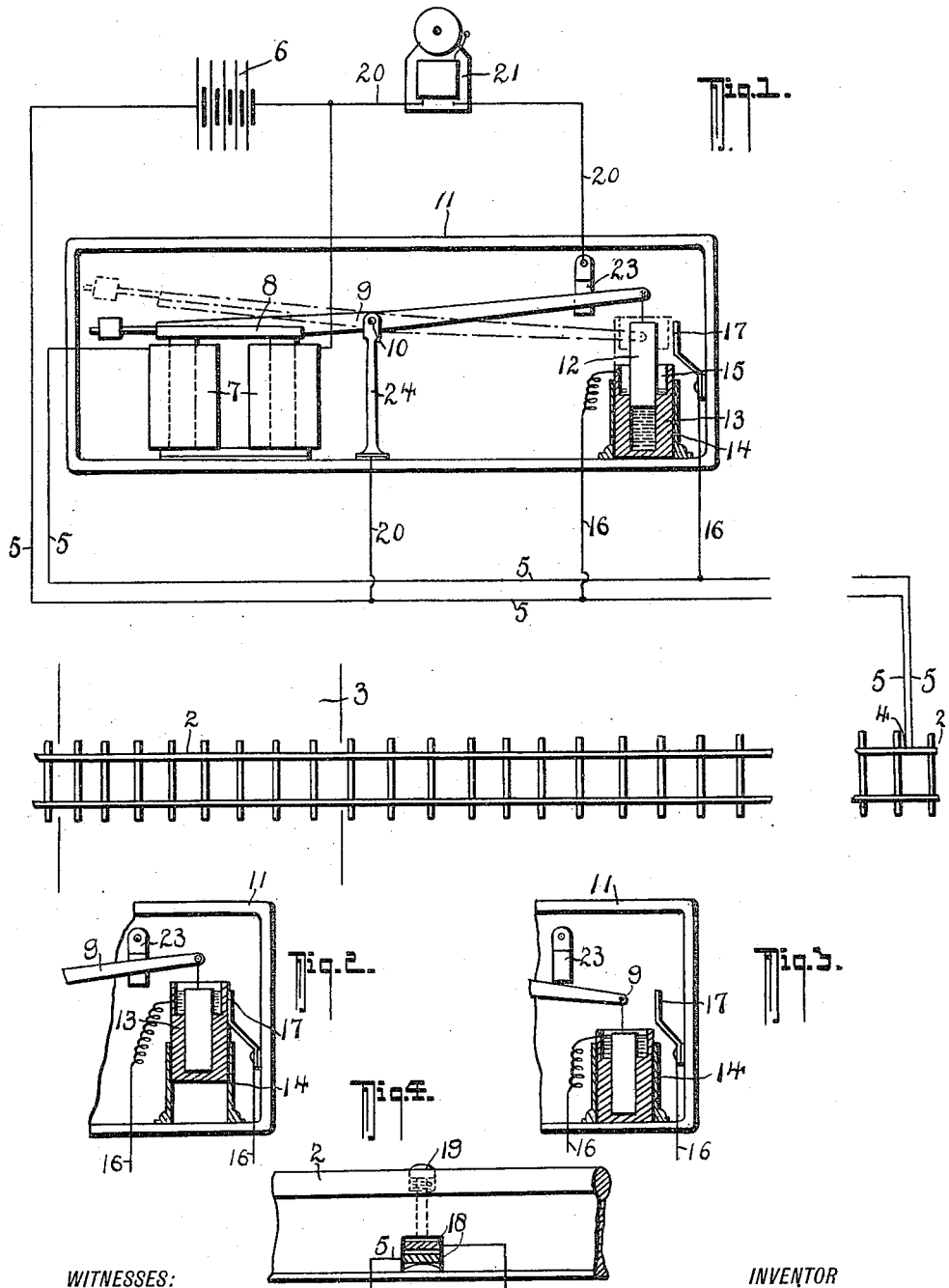

GEORGE NEVILLE, OF VANCOUVER, BRITISH COLUMBIA, CANADA.

RAILWAY-CROSSING ALARM.

1,154,047.

Specification of Letters Patent.

Patented Sept. 21, 1915.

Application filed November 8, 1912. Serial No. 730,178.

*To all whom it may concern:*

Be it known that I, GEORGE NEVILLE, citizen of the Dominion of Canada, residing at Vancouver, in the Province of British Columbia, Canada, have invented a new and useful Railway-Crossing Alarm, of which the following is a specification.

This invention relates to an alarm for railway crossings which is designed to render such more safe, by providing an electrically operated alarm bell which is automatically set in action by an approaching train while the latter is at a safe distance from it, and continues to ring for a sensible period of time after the vehicle or train has passed over the original closing contact. This object is attained by providing an electrical circuit extending toward the direction of approach which circuit is momentarily closed by the passage of a vehicle or train over contacts on the track. In this circuit is an electro-magnet which, when energized, acts to close the same circuit in a more enduring manner and at the same time connects the alarm bell in the battery circuit. The secondary closing contacts are coöperative with a dash pot the slow fall of which by gravity determine the endurance of the alarm.

The invention is particularly described in the following specification, reference being made to the drawings by which it is accompanied, in which:

Figure 1 is a general arrangement of the apparatus shown more or less diagrammatically. Figs. 2 and 3 are sections of the dash pot and its contact in the two extremes of its movement, and Fig. 4 is a side elevation showing the closing contact of the main circuit in the track rail.

In these drawings 2 represents the track rails and 3 the location of the level crossing.

Situated at 4 at a sufficient distance from the crossing 3 in the direction of approach contacts 18 are provided in one of the rails 2, which contacts close an electrical circuit 5 in which, adjacent to the crossing 3, is a battery 6 and electro-magnet 7. The armature 8 of this electro-magnet 7 is secured on a lever 9 which is pivoted at 10 in the box 11 which holds the mechanism, and carries at its other end the plunger 12 of a dash pot 13. This dash pot 13 is vertically movable in a guiding cylinder 14 secured to the base of box 11 and its upper end is chambered, as at 15, to form a receptacle for the oil displaced from the dash pot when the plunger is at the lower limit of its movement.

The dash pot 13 is free to move vertically either up or down in a guiding cylinder 14, which cylinder 14 is secured to the base board of the box 11 and the upper end of the dash pot 13 is chambered as at 15, to form a receptacle for the oil displaced from below the plunger 12 when that plunger is at the lower limit of its movement with relation to the dash pot 13. The dash pot body 13 is connected in a shunt circuit 16 from the main circuit 5, the shunt being closed by a resilient contact 17 when the dash pot body 13 engages it after the dash pot body has been lifted in its guiding cylinder 14 as shown in Fig. 2. In the normal position of the parts the lever 9 rests in the dotted position shown in Fig. 1, or the full position shown in Fig. 3, and the dash pot also remains in the position shown in Fig. 3. Thus, when a passing vehicle momentarily closes the contacts 18 of the main circuit 5 at 4 the electro-magnet 7 is energized and closes the same circuit in a more enduring manner by means of the shunt circuit 16 in which is the dash pot 13 and resilient contact 17. This secondary closure endures while the dash pot is falling slowly off its plunger 12, which movement is delayed by the passage of the oil or other fluid from the chambering 15 to beneath the plunger.

The alarm bell 21 is in a supplementary shunt circuit 20 which connects the main circuit 5, in which is the battery and electro-magnet, through a resilient contact 23 which is engaged by the lever 9 at the upper part of its movement, and through that lever, and its fulcrum. By this means, when the main circuit is closed at the contact 17, the alarm bell circuit 20 is also closed and remains closed until the dash pot falls and draws with it the lever 9 off the contact 23.

The closing contact 18 of the main circuit 5 at 4 is actuated by the wheels of a passing train by a plunger 19 fitting a chambered aperture drilled in the rail 2 and having a spring under its head to hold it normally above the flush of the rail.

In use, when a vehicle passes at 4 over the plunger 19 of the contacts 18, the circuit 5 is momentarily closed and the electro-magnet 7 which is in this circuit is energized, and its armature 8, is drawn down to the poles of the magnet. Through the lever 9 to which the armature 8 is attached, the plunger 12 on the other end of the lever is drawn up and with it the dash pot 13 in which it fits. The body of the dash pot 13 engages the contact 17 and closes the circuit 5 through the shunt circuit 16, so that that circuit, in which is the battery and electro-magnet, will remain closed after the train has passed over the contact at 4, until the dash pot 13 falls slowly by gravity from engagement with the resilient contact 17. While the lever 9 is at the upper limit of its movement the alarm bell 21 will ring, as its supplementary shunt circuit 20 is closed by the lever 9 in engagement with the resilient contact 23. The gravity fall of the dash pot 13 is delayed while the oil or other fluid in the chambering 15 of the dash pot passes back under the plunger, as shown in Fig. 1.

The normal position of the dash pot and its plunger is represented in Fig. 3 and when the lever 9 is lifted from this position the dash pot will be lifted with it, as shown in Fig. 2. From this position the dash pot will fall gradually to the position represented in Fig. 1, when the circuit being opened at the contact 17, the electro-magnet will be deenergized and the dash pot plunger 12 will fall gradually to its normal position in the dash pot, as represented in Fig. 3.

Having now particularly described my invention and the manner of its operation and use, I hereby declare that what I claim as new and desire to be protected in by Letters Patent, is:

1. In a railway crossing alarm, a normally open electric circuit, a source of electric energy in said circuit, and a signal in a shunt to said circuit, an electro magnetic switching device in said circuit, operative upon the closing of said circuit for bringing said signal into operative condition and means for delaying the opening of the circuit of the switching device after the circuit has been restored at its normally open place, said last named means including a dash pot, the piston of which is connected to said switching device, the cylinder of which is free to move with said switching device, and having limited movement under the influence of gravity, and means coöperative with said dash pot for closing said electric circuit.

2. In a railway crossing alarm, the combination with the railway track, of an electric circuit, a circuit closing contact in one of the rails of the track arranged to be closed upon the passage of a train over it, and said contact being connected in said electric circuit, a source of electric energy in said circuit and a signal in a shunt to said circuit, said circuit, an electro-magnetic switching device in said circuit operative upon the closing of said track contact for bringing said signal into operative condition, and means for delaying the opening of the circuit after the vehicle has passed over the rail contact, said last named means comprising a dash pot, the piston of which is connected to said switching device, the cylinder of which is free to move with said switching device, and having limited movement under the influence of gravity, and means coöperative with said dash pot for closing said electric circuit.

3. A railway crossing alarm, comprising the combination with the track, of an electric circuit, and a source of electric energy in said circuit, a train operated circuit closer and a magnet also in said circuit, a contact lever having an armature coöperating with said magnet, a signal, a signal circuit arranged as a shunt from the electro-magnet circuit and closable by said contact lever, a second shunt circuit to the main circuit, and means governed by the movement of said lever and closing of said second shunt circuit for delaying the opening of the circuit after the vehicle has passed over the original opening contact, said last named means including a dash pot, one element of which is connected to and movable with said lever and the other element of said dash pot having vertical movement under its own weight with relation to the first mentioned element of the dash pot, said second shunt circuit having one terminal connected to said vertically movable element of the dash pot, and a fixed contact to which the other terminal of said second shunt circuit is connected, said fixed contact adapted to be engaged by said second mentioned element of the dash pot when the same is elevated.

4. A railway crossing alarm, comprising the combination with a train operated circuit closing contact, an electro-magnet, a source of energy, and an electric circuit including the aforesaid parts, of a signal, and a signal operating switch device including a lever having an armature portion coöperative with said electro magnet, operative connections between said lever and said signal, and means for delaying the opening of the magnet circuit after the vehicle has passed over the circuit closer of the same, said means comprising a dash pot, one element of which is connected and movable with said lever, the other element of which is free to move on said first mentioned element subject to the retarding influence of the dash pot action, and a guide for said second element of said dash pot whereby when said magnets are energized to shift said lever, said dash pot will move with said lever as a whole, and the second element of said dash pot will then move with relation to the first element of the dash pot under the influence of gravity in said dash pot guide, and a connecting shunt to said magnet circuit connected with said second element of said dash pot and with a fixed contact for effecting the delaying action, substantially as shown and for the purposes described.

5. In a railway crossing alarm, the combination with an electric circuit normally open at a predetermined place and adapted to be closed at such place, a source of electric energy in said circuit and a signal in a shunt to said circuit, an electro magnetic switch device including electro magnets in said circuit, a switch lever operated by said magnet said switch lever being in said shunt and a switch contact coöperative with said lever also in said shunt, and means for delaying the opening of the circuit through said electro magnet and said shunt after said electric circuit has been opened at the normally open place, said last named means comprising a dash pot the piston of which is connected to said lever, and the cylinder of which is free to move with said lever and piston and having limited movement under the influence of gravity, and an electrical connection between said circuit and said dash pot.

In testimony whereof I have signed my name to this specification in the presence of two subscribing witnesses.

GEORGE NEVILLE.

Witnesses:
ROWLAND BRITTAIN,
MAY WHYTE.

Copies of this patent may be obtained for five cents each, by addressing the "Commissioner of Patents, Washington, D. C."